US011305744B2

(12) United States Patent
Suzuki et al.

(10) Patent No.: US 11,305,744 B2
(45) Date of Patent: Apr. 19, 2022

(54) CONTROLLER FOR BRAKING FORCE GENERATED BY BRAKE SYSTEM OF MOTORCYCLE, AND CONTROL METHOD OF THE SAME

(71) Applicant: Robert Bosch GmbH, Stuttgart (DE)

(72) Inventors: Koji Suzuki, Kanagawa (JP); Shunsaku Ono, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 16/323,838

(22) PCT Filed: Jul. 5, 2017

(86) PCT No.: PCT/IB2017/054039
§ 371 (c)(1),
(2) Date: Feb. 7, 2019

(87) PCT Pub. No.: WO2018/029550
PCT Pub. Date: Feb. 15, 2018

(65) Prior Publication Data
US 2021/0213922 A1    Jul. 15, 2021

(30) Foreign Application Priority Data
Aug. 10, 2016    (JP) .............................. JP2016-157230

(51) Int. Cl.
*B60T 8/32*    (2006.01)
*B60T 8/17*    (2006.01)
(Continued)

(52) U.S. Cl.
CPC ............ *B60T 8/3225* (2013.01); *B60T 8/171* (2013.01); *B60T 8/172* (2013.01); *B60T 8/1706* (2013.01);
(Continued)

(58) Field of Classification Search
CPC ...... B60T 8/3225; B60T 8/1706; B60T 8/171; B60T 8/172; B60T 8/176; B60T 2240/00; B60T 2250/04; B60T 2270/10; B62L 3/00
See application file for complete search history.

(56) References Cited

U.S. PATENT DOCUMENTS 5,365,444 A * 11/1994 Suzuki .................. B60T 8/1706
180/170
5,385,393 A * 1/1995 Tanaka .................. B60T 8/1706
303/150
(Continued)

FOREIGN PATENT DOCUMENTS

CN    101898560 A    12/2010
CN    103359093 A    10/2013
(Continued)

OTHER PUBLICATIONS

International Search Report for Application No. PCT/IB2017/054039 dated Oct. 5, 2017 (English Translation, 2 pages).

*Primary Examiner* — Russell Frejd
(74) *Attorney, Agent, or Firm* — Michael Best & Friedrich LLP

(57) ABSTRACT

A controller and a control method capable of optimizing a braking force generated by a brake system are obtained. During deceleration of a motorcycle, the controller and the control method according to the invention obtain an estimated vehicle body speed Vbe of the motorcycle that is estimated on the basis of speed information of a wheel, obtain a corrected vehicle body speed Vbc that is obtained by correcting an actually-measured vehicle body speed of the motorcycle to a low-speed side, cause the brake system to generate the braking force that corresponds to the estimated vehicle body speed Vbe in a state where the estimated vehicle body speed Vbe is higher than the corrected vehicle body speed Vbc, and cause the brake system to generate the (Continued)

braking force that corresponds to the corrected vehicle body speed Vbc in a state where the estimated vehicle body speed Vbe is lower than the corrected vehicle body speed Vbc.

10 Claims, 5 Drawing Sheets

(51) Int. Cl.
    *B60T 8/171*     (2006.01)
    *B60T 8/172*     (2006.01)
    *B60T 8/176*     (2006.01)
    *B62L 3/00*     (2006.01)

(52) U.S. Cl.
    CPC ........... *B60T 8/176* (2013.01); *B60T 2240/00* (2013.01); *B60T 2250/04* (2013.01); *B60T 2270/10* (2013.01); *B62L 3/00* (2013.01)

(56) References Cited

U.S. PATENT DOCUMENTS

| | | | | |
|---|---|---|---|---|
| 5,573,313 A * | 11/1996 | Suzuki | ................. | B60T 8/1706 303/115.2 |
| 5,577,816 A * | 11/1996 | Suzuki | ................. | B60T 8/1706 303/163 |
| 2007/0213899 A1* | 9/2007 | Watanabe | ............... | G01P 15/18 701/37 |
| 2007/0213904 A1* | 9/2007 | Watanabe | ............... | G01P 15/08 701/45 |
| 2011/0095599 A1* | 4/2011 | Watanabe | ............... | B60T 8/885 303/137 |

FOREIGN PATENT DOCUMENTS

| | | |
|---|---|---|
| CN | 104039613 A | 9/2014 |
| EP | 0476582 | 3/1992 |
| JP | 09301150 | 11/1997 |
| JP | 2005238902 | 9/2005 |

\* cited by examiner

CONTROLLER FOR BRAKING FORCE GENERATED BY BRAKE SYSTEM OF MOTORCYCLE, AND CONTROL METHOD OF THE SAME

BACKGROUND OF THE INVENTION

The invention relates to a controller for a braking force generated by a brake system of a motorcycle and to a control method of the braking force generated by the brake system of the motorcycle.

As a conventional brake system of a motorcycle, a brake system in which a controller obtains speed information of a wheel during deceleration of the motorcycle and causes the brake system to generate a braking force that corresponds to an estimated vehicle body speed of the motorcycle estimated on the basis of the speed information has been available. The braking force is controlled, for example, when the controller controls operations of a valve, a pump, and the like of the brake system (for example, see JP-A-2005-238902).

SUMMARY OF THE INVENTION

In the conventional brake system of the motorcycle, the estimated vehicle body speed of the motorcycle is estimated on the basis of the speed information of the wheel. Accordingly, a difference of the estimated vehicle body speed from an actual vehicle body speed of the motorcycle is changed in accordance with a change in slip occurred to the wheel, which possibly makes it difficult to generate an appropriate braking force. For example, when the wheel is locked or possibly locked during the deceleration of the motorcycle, the estimated vehicle body speed of the motorcycle is estimated to be low, and a slip rate of the wheel is underestimated with respect to an actual slip rate, which possibly delays initiation of an operation to reduce the braking force on the wheel.

The invention has been made in view of the above-described problem and therefore obtains a controller capable of optimizing a braking force generated by a brake system. The invention also obtains a control method capable of optimizing the braking force generated by the brake system.

A controller according to the invention is a controller for a braking force generated by a brake system of a motorcycle and includes: an estimated vehicle body speed obtainment section that obtains an estimated vehicle body speed of the motorcycle estimated on the basis of speed information of a wheel; a braking force control execution section that causes the brake system to generate the braking force corresponding to the estimated vehicle body speed obtained by the estimated vehicle body speed obtainment section; and a corrected vehicle body speed obtainment section that obtains a corrected vehicle body speed obtained by correcting an actually-measured vehicle body speed of the motorcycle to a low-speed side. During deceleration of the motorcycle, the braking force control execution section causes the brake system to generate the braking force that corresponds to the estimated vehicle body speed in a state where the estimated vehicle body speed is higher than the corrected vehicle body speed, and causes the brake system to generate the braking force that corresponds to the corrected vehicle body speed in a state where the estimated vehicle body speed is lower than the corrected vehicle body speed.

A control method according to the invention is a control method of a braking force generated by a brake system of a motorcycle and includes: an estimated vehicle body speed obtainment step of obtaining an estimated vehicle body speed of the motorcycle that is estimated on the basis of speed information of a wheel; a braking force control execution step of causing the brake system to generate the braking force that corresponds to the estimated vehicle body speed obtained in the estimated vehicle body speed obtainment step; and a corrected vehicle body speed obtainment step of obtaining a corrected vehicle body speed that is obtained by correcting an actually-measured vehicle body speed of the motorcycle to a low-speed side. In the braking force control execution step, during deceleration of the motorcycle, the brake system generates the braking force that corresponds to the estimated vehicle body speed in a state where the estimated vehicle body speed is higher than the corrected vehicle body speed, and the brake system generates the braking force that corresponds to the corrected vehicle body speed in a state where the estimated vehicle body speed is lower than the corrected vehicle body speed.

The controller and the control method according to the invention obtain the corrected vehicle body speed that is obtained by correcting the actually-measured vehicle body speed to the low-speed side, causes the brake system to generate the braking force that corresponds to the estimated vehicle body speed in the state where the estimated vehicle body speed is higher than the corrected vehicle body speed, and causes the brake system to generate the braking force that corresponds to the corrected vehicle body speed in the state where the estimated vehicle body speed is lower than the corrected vehicle body speed. Accordingly, in a state where the estimated vehicle body speed significantly differs from an actual vehicle body speed of the motorcycle, the braking force is controlled in accordance with the corrected vehicle body speed whose difference from the actual vehicle body speed of the motorcycle is smaller than that of the estimated vehicle body speed. In this way, the braking force generated by the brake system is optimized.

DETAILED DESCRIPTION

A description will hereinafter be made on a controller and a control method according to the invention by using the drawings. Note that a configuration, an operation, and the like, which will be described below, constitute merely one example and each of the controller and the control method according to the invention is not limited to a case with such a configuration, an operation, and the like. In each of the drawings, components will appropriately be simplified or not be depicted.

A description will hereinafter be made on a brake system according to a first embodiment.

<Configuration of Brake System>

A description will be made on a configuration of the brake system according to the first embodiment.

Figure 1:
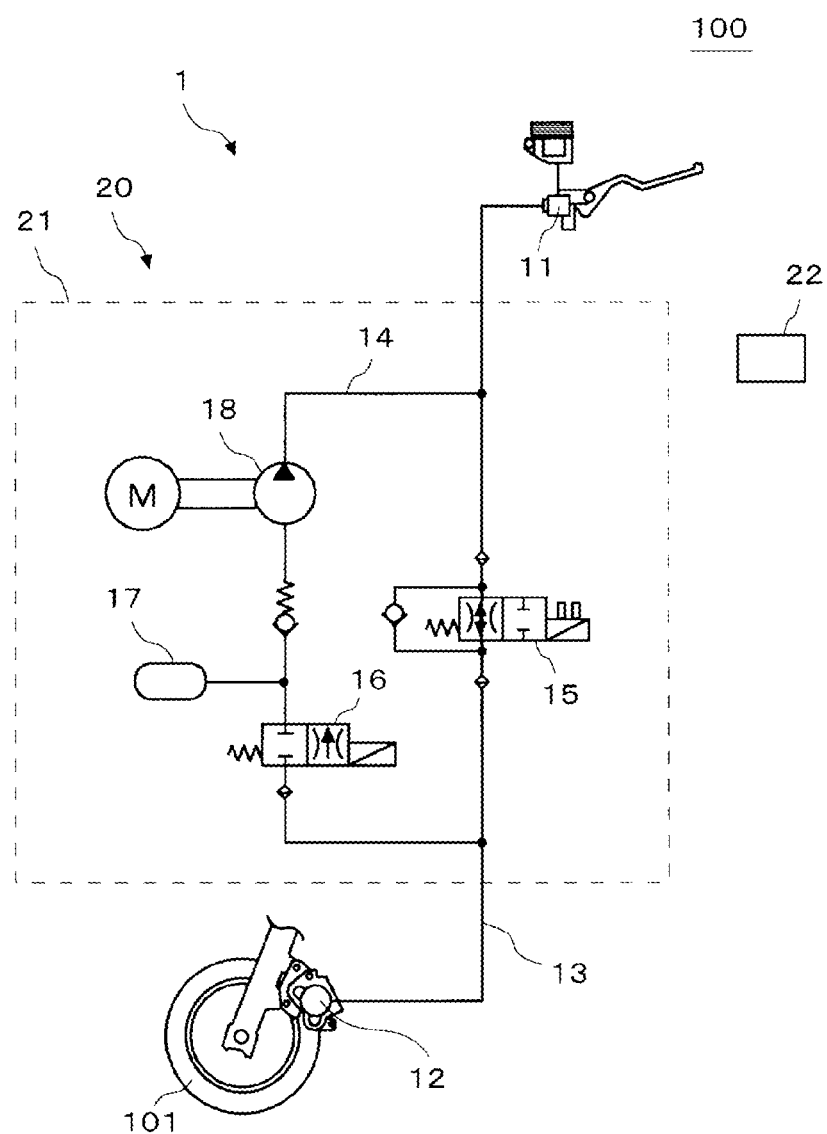
FIG. 1 is a view of one example of a configuration of a brake system according to a first embodiment of the invention.

FIG. 1 is a view of one example of the configuration of the brake system according to the first embodiment of the invention.

As depicted in FIG. 1, a brake system 1 is mounted on a motorcycle 100. The motorcycle 100 is a two-wheeled motor vehicle, a three-wheeled motor vehicle, or the like. The brake system 1 includes a master cylinder 11, a wheel cylinder 12, a primary channel 13 that communicates between the master cylinder 11 and the wheel cylinder 12, and a secondary channel 14 through which brake fluid in the wheel cylinder 12 is released.

The primary channel 13 is provided with an inlet valve 15. The secondary channel 14 is provided with an outlet valve 16, an accumulator 17, and a pump 18. A hydraulic pressure control unit 20 is configured by including: members that include the inlet valve 15, the outlet valve 16, the accumulator 17, the pump 18, and the like; a base body 21 that is provided with those members and is formed with a channel constituting the primary channel 13 and the secondary channel 14 therein; and a controller (ECU) 22. More specifically, the hydraulic pressure control unit 20 is a unit that has a function of controlling hydraulic pressure of the brake fluid in the wheel cylinder 12 in the brake system 1. The controller 22 governs operations of the inlet valve 15, the outlet valve 16, the pump 18, and the like. That is, the controller 22 controls a braking force generated by the brake system 1.

Note that the members may collectively be provided in the single base body 21 or may separately be provided in the plural base bodies 21. The controller 22 may be provided as one unit or may be divided into plural units. The controller 22 may be attached to the base body 21 or may be attached to a component other than the base body 21. The controller 22 may partially or entirely be constructed of a microcomputer, a microprocessor unit, or the like, may be constructed of firmware and the like which can be updated, or may be a program module or the like that is executed by a command from a CPU or the like, for example.

In a normal state, the controller 22 opens the inlet valve 15 and closes the outlet valve 16. When a brake operation section of the motorcycle 100 is operated in such a state, a piston of the master cylinder 11 is pressed to increase the hydraulic pressure of the brake fluid in the wheel cylinder 12, a brake pad is pressed against a rotor, and a wheel 101 of the motorcycle 100 is thereby braked.

For example, when the wheel 101 is locked or possibly locked, the controller 22 closes the inlet valve 15, opens the outlet valve 16, and drives the pump 18, so as to reduce the hydraulic pressure of the brake fluid in the wheel cylinder 12.

Noted that FIG. 1 depicts a case where the wheel 101, the braking force on which is controlled by the hydraulic pressure control unit 20, is a front wheel of the motorcycle 100; however, the wheel 101, the braking force on which is controlled by the hydraulic pressure control unit 20, may be a rear wheel of the motorcycle 100 or may be both of the front wheel and the rear wheel of the motorcycle 100.

<System Configuration of Brake System>

A description will be made on a system configuration of the brake system according to the first embodiment.

Figure 2:
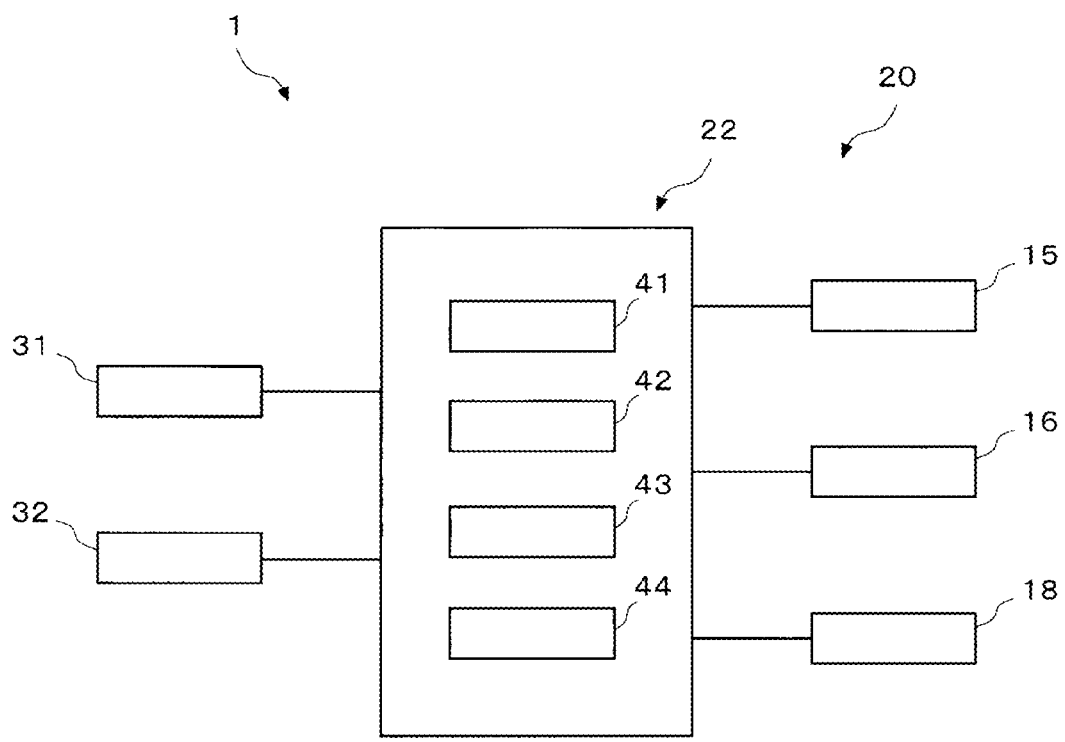
FIG. 2 is a diagram of one example of a system configuration of the brake system according to the first embodiment of the invention.

FIG. 2 is a diagram of one example of the system configuration of the brake system according to the first embodiment of the invention.

As depicted in FIG. 2, the controller 22 includes an estimated vehicle body speed obtainment section 41, an actually-measured vehicle body speed obtainment section 42, a corrected vehicle body speed obtainment section 43, and a braking force control execution section 44.

The estimated vehicle body speed obtainment section 41 obtains an estimated vehicle body speed Vbe of the motorcycle 100. The estimated vehicle body speed Vbe is estimated on the basis of a detection result of a wheel speed sensor 31 that detects speed information Ivw of the wheel 101 of the motorcycle 100. The wheel speed sensor 31 may detect a rotational frequency of the wheel 101 or may detect another physical quantity that can be converted to the rotational frequency of the wheel 101. For example, the estimated vehicle body speed obtainment section 41 may convert the rotational frequency of the wheel 101, which is detected by the wheel speed sensor 31, to a peripheral speed Vw and obtain the peripheral speed Vw as the estimated vehicle body speed Vbe, or may obtain a value that is obtained by performing a specified calculation on the peripheral speed Vw as the estimated vehicle body speed Vbe. In other words, the estimated vehicle body speed Vbe may be estimated by using any of various known methods.

The actually-measured vehicle body speed obtainment section 42 obtains an actually-measured vehicle body speed Vbm of the motorcycle 100. The actually-measured vehicle body speed Vbm is obtained on the basis of a detection result of an auxiliary speed sensor 32 that detects speed information Ivs of a portion (for example, a member constituting an engine system, or the like) other than the wheel (that is, the wheel 101 and a wheel other than the wheel 101) of the motorcycle 100. The auxiliary speed sensor 32 is already provided to display a speed on a speedometer of the motorcycle 100, for example. The auxiliary speed sensor 32 may detect the actually-measured vehicle body speed Vbm or may detect another physical quantity that can be converted to the actually-measured vehicle body speed Vbm. Reliability of the detection result of the auxiliary speed sensor 32 is lower than reliability of the detection result of the wheel speed sensor 31. The controller 22 may not be connected to the auxiliary speed sensor 32. For example, the controller 22 may be connected to another controller that receives the detection result of the auxiliary speed sensor 32, and may obtain the actually-measured vehicle body speed Vbm from the controller.

The corrected vehicle body speed obtainment section 43 obtains a corrected vehicle body speed Vbc that is obtained by correcting the actually-measured vehicle body speed Vbm to a low-speed side. More specifically, the corrected vehicle body speed obtainment section 43 obtains the corrected vehicle body speed Vbc by multiplying the actually-measured vehicle body speed Vbm at each time point, which is obtained by the actually-measured vehicle body speed obtainment section 42, by a reduction coefficient α ($0<α<1$) set in advance. In addition, the corrected vehicle body speed obtainment section 43 obtains the corrected vehicle body speed Vbc by replacing the actually-measured vehicle body speed Vbm at each of the time points, which is obtained by the actually-measured vehicle body speed obtainment section 42, with the lowest actually-measured vehicle body speed Vbm obtained in a period from initiation of deceleration of the motorcycle 100 to a current time point.

The braking force control execution section 44 selectively uses the estimated vehicle body speed Vbe, which is obtained by the estimated vehicle body speed obtainment section 41, and the corrected vehicle body speed Vbc, which is obtained by the corrected vehicle body speed obtainment section 43, so as to cause the brake system 1 to generate the braking force. For example, the braking force control execution section 44 calculates a slip rate of the wheel 101 on the basis of the selected estimated vehicle body speed Vbe or the selected corrected vehicle body speed Vbc, increases/reduces the braking force to be generated on the wheel 101 in accordance with the slip rate, and thereby handles locking or possible locking of the wheel 101.

In a state where the estimated vehicle body speed Vbe is higher than the corrected vehicle body speed Vbc, the braking force control execution section 44 causes the brake system 1 to generate the braking force that corresponds to the estimated vehicle body speed Vbe. On the other hand, in a state where the estimated vehicle body speed Vbe is lower than the corrected vehicle body speed Vbc, the braking force control execution section 44 causes the brake system 1 to generate the braking force that corresponds to the corrected vehicle body speed Vbc. A magnitude relationship between the estimated vehicle body speed Vbe and the corrected vehicle body speed Vbc may be determined by a comparison between the estimated vehicle body speed Vbe and the corrected vehicle body speed Vbc or may be determined by a comparison of other physical quantities that is equivalent to the above comparison.

In states where the actually-measured vehicle body speed Vbm has an increasing tendency and the estimated vehicle body speed Vbe is lower than the corrected vehicle body speed Vbc, the braking force control execution section 44 causes the brake system 1 to generate the braking force that corresponds to the estimated vehicle body speed Vbe. More specifically, the braking force control execution section 44 determines that the actually-measured vehicle body speed Vbm is shifted to the state with the increasing tendency in the case where the actually-measured vehicle body speed Vbm, which is obtained at each of the time points, continues to be in a state of not becoming the lowest actually-measured vehicle body speed Vbm obtained in the period from the initiation of the deceleration of the motorcycle 100 to the current time point for a reference time T or longer. In addition, the braking force control execution section 44 causes the brake system 1 to generate the braking force that corresponds to the estimated vehicle body speed Vbe in a period from a time point at which the actually-measured vehicle body speed Vbm is shifted to be in the state with the increasing tendency to a time point at which the estimated vehicle body speed Vbe is shifted to be in a state of being equal to or higher than the corrected vehicle body speed Vbc. The magnitude relationship between the estimated vehicle body speed Vbe and the corrected vehicle body speed Vbc may be determined by the comparison between the estimated vehicle body speed Vbe and the corrected vehicle body speed Vbc or may be determined by the comparison of the other physical quantities that is equivalent to the above comparison.

<Control Flow of Brake System>

A description will be made on a control flow of the brake system according to the first embodiment.

Figure 3:
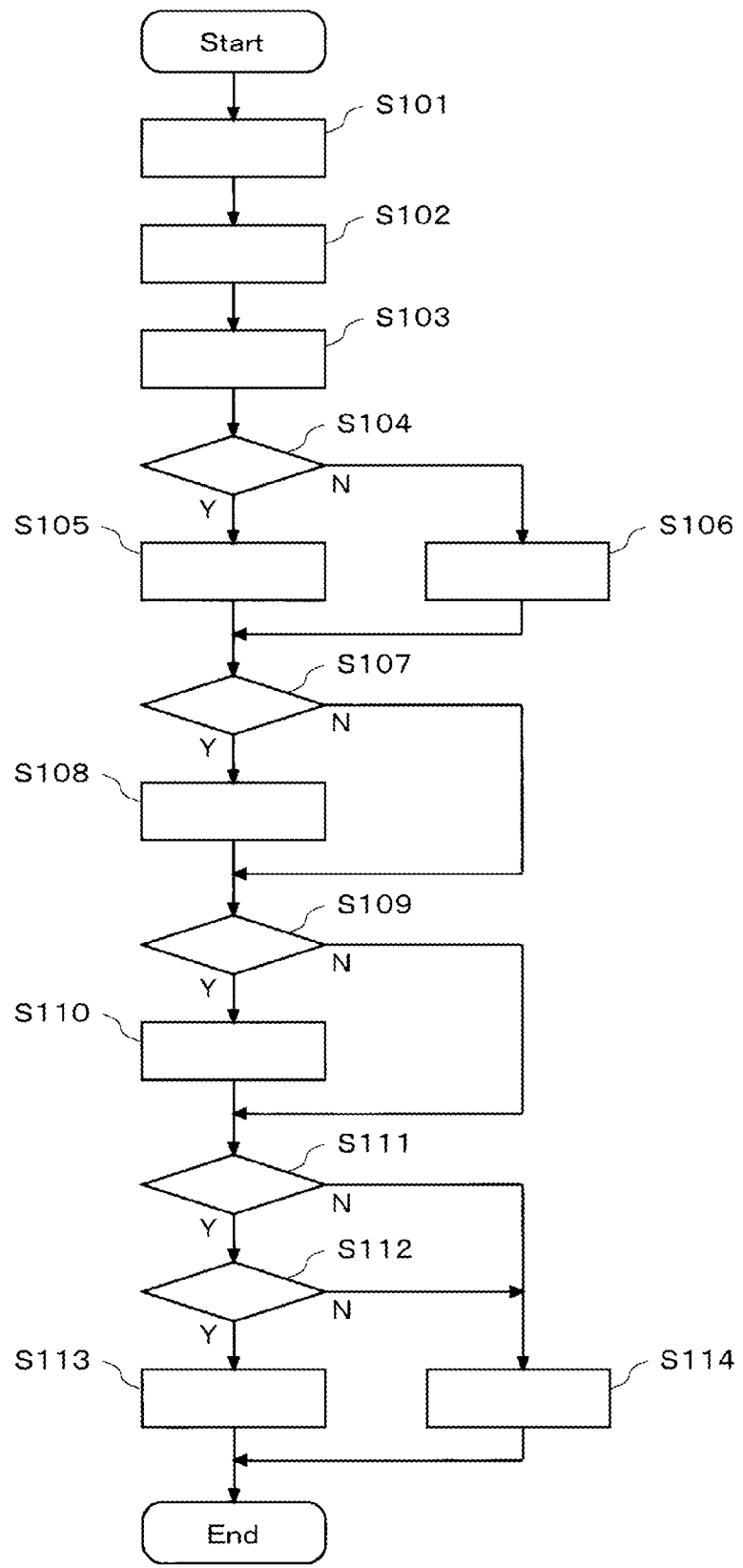
FIG. 3 is a chart of one example of a control flow of the brake system according to the first embodiment of the invention.

FIG. 3 is a chart of one example of the control flow of the brake system according to the first embodiment of the invention.

Every time the motorcycle 100 decelerates, the controller 22 repeatedly executes a series of a control flow as depicted in FIG. 3.

(Estimated Vehicle Body Speed Obtainment Step)

In step S101, the estimated vehicle body speed obtainment section 41 obtains the estimated vehicle body speed Vbe. The estimated vehicle body speed Vbe is estimated on the basis of the detection result of the wheel speed sensor 31.

(Actually-Measured Vehicle Body Speed Obtainment Step)

In step S102, the actually-measured vehicle body speed obtainment section 42 obtains the actually-measured vehicle body speed Vbm of the motorcycle 100. The actually-measured vehicle body speed Vbm is obtained on the basis of the detection result of the auxiliary speed sensor 32.

(Corrected Vehicle Body Speed Obtainment Step)

In step S103, the corrected vehicle body speed obtainment section 43 obtains the corrected vehicle body speed Vbc that is obtained by correcting the actually-measured vehicle body speed Vbm to the low-speed side. More specifically, the corrected vehicle body speed obtainment section 43 obtains a reduced actually-measured vehicle body speed Vbms by multiplying the actually-measured vehicle body speed Vbm at each of the time points, which is obtained by the actually-measured vehicle body speed obtainment section 42, by the reduction coefficient α ($0<α<1$) set in advance, replaces the reduced actually-measured vehicle body speed Vbms with the lowest reduced actually-measured vehicle body speed Vbms obtained in a period from the initiation of the deceleration of the motorcycle 100 to a current time point, and thereby obtains the corrected vehicle body speed Vbc. Note that an order of the multiplication and the replacement may be reversed.

(Braking Force Control Execution Step)

In step S104, the braking force control execution section 44 determines whether the corrected vehicle body speed Vbc is equal to the corrected vehicle body speed Vbc that is obtained immediately before this step. If the determination is Yes, the process proceeds to step S105. If the determination is No, the process proceeds to step S106.

In step S105, the braking force control execution section 44 counts up a timer. In step S106, the braking force control execution section 44 resets the timer. The timer is used to determine whether the actually-measured vehicle body speed Vbm has been shifted to the state with the increasing tendency.

In step S107, the braking force control execution section 44 determines whether a duration of time indicated by the timer is equal to or longer than the reference time T. If the determination is Yes, the process proceeds to step S108. If the determination is No, the process proceeds to step S109.

In step S108, the braking force control execution section 44 sets an increasing tendency flag F used to identify that the actually-measured vehicle body speed Vbm has been shifted to the state with the increasing tendency. More specifically, the braking force control execution section 44 determines that the actually-measured vehicle body speed Vbm has been shifted to the state with the increasing tendency in the case where the actually-measured vehicle body speed Vbm, which is obtained at each of the time points, continues to be in the state of not becoming the lowest actually-measured vehicle body speed Vbm obtained in the period from the initiation of the deceleration of the motorcycle 100 to the current time point for the reference time T or longer.

In step S109, the braking force control execution section 44 determines whether the estimated vehicle body speed Vbe is equal to or higher than the corrected vehicle body speed Vbc. If the determination is Yes, the process proceeds to step S110. If the determination is No, the process proceeds to step S111.

In step S110, the braking force control execution section 44 resets the increasing tendency flag F. More specifically, the braking force control execution section 44 keeps the increasing tendency flag F in the period from the time point at which the actually-measured vehicle body speed Vbm is shifted to be in the state with the increasing tendency to the time point at which the estimated vehicle body speed Vbe is shifted to the state of being equal to or higher than the corrected vehicle body speed Vbc.

In step S111, the braking force control execution section 44 determines whether the increasing tendency flag F is unset. If the determination is Yes, the process proceeds to step S112. If the determination is No, the process proceeds to step S114.

In step S112, the braking force control execution section 44 determines whether the estimated vehicle body speed Vbe is lower than the corrected vehicle body speed Vbc. If the determination is Yes, the process proceeds to step S113. If the determination is No, the process proceeds to step S114.

In step S113, the braking force control execution section 44 causes the brake system 1 to generate the braking force that corresponds to the corrected vehicle body speed Vbc. In step S114, the braking force control execution section 44 causes the brake system 1 to generate the braking force that corresponds to the estimated vehicle body speed Vbe. More specifically, in the state where the estimated vehicle body speed Vbe is higher than the corrected vehicle body speed Vbc, the braking force control execution section 44 causes the brake system 1 to generate the braking force that corresponds to the estimated vehicle body speed Vbe. Meanwhile, in the state where the estimated vehicle body speed Vbe is lower than the corrected vehicle body speed Vbc, the braking force control execution section 44 causes the brake system 1 to generate the braking force that corresponds to the corrected vehicle body speed Vbc. In states where the corrected vehicle body speed Vbc has an increasing tendency and the estimated vehicle body speed Vbe is lower than the corrected vehicle body speed Vbc, the braking force control execution section 44 causes the brake system 1 to generate the braking force that corresponds to the estimated vehicle body speed Vbe.

Figure 4:
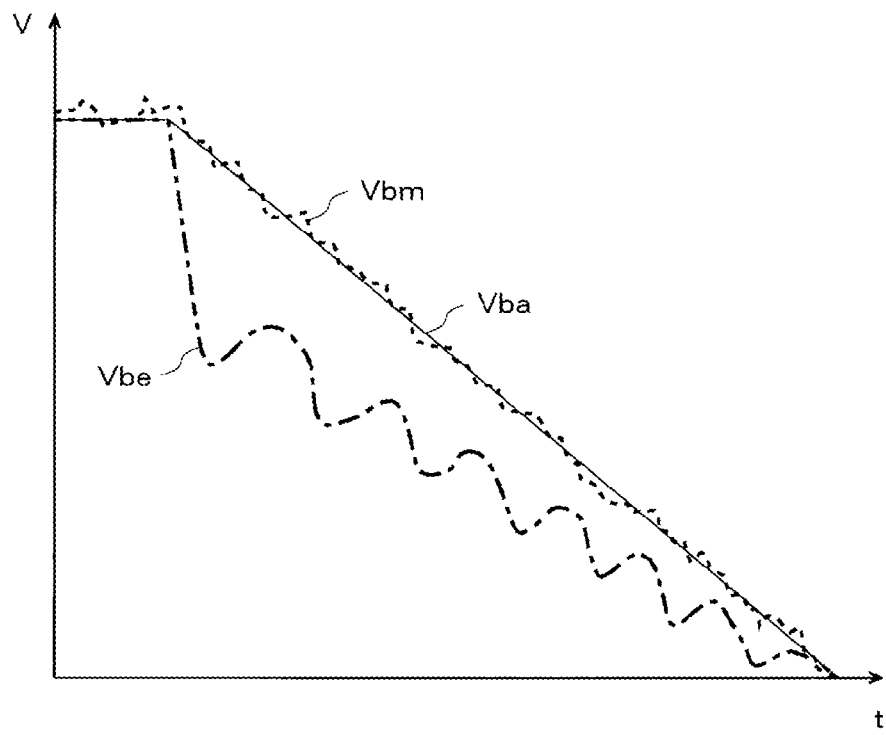
FIG. 4 is a chart of behavior of the brake system according to the first embodiment of the invention in the control flow depicted in FIG. 3.
Figure 5:
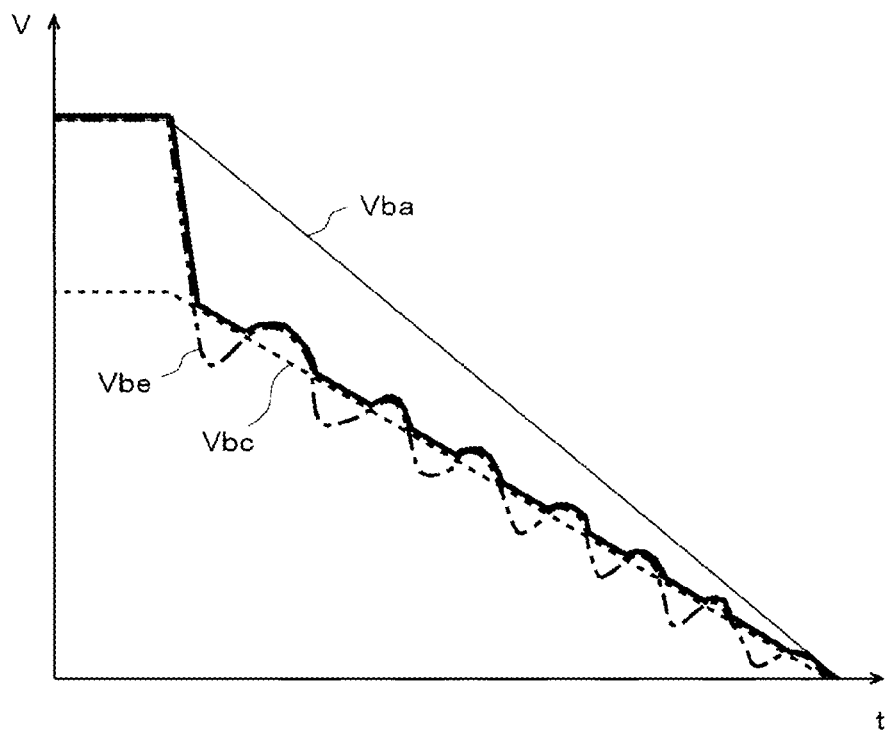
FIG. 5 is a chart of the behavior of the brake system according to the first embodiment of the invention in the control flow depicted in FIG. 3.
Figure 6:
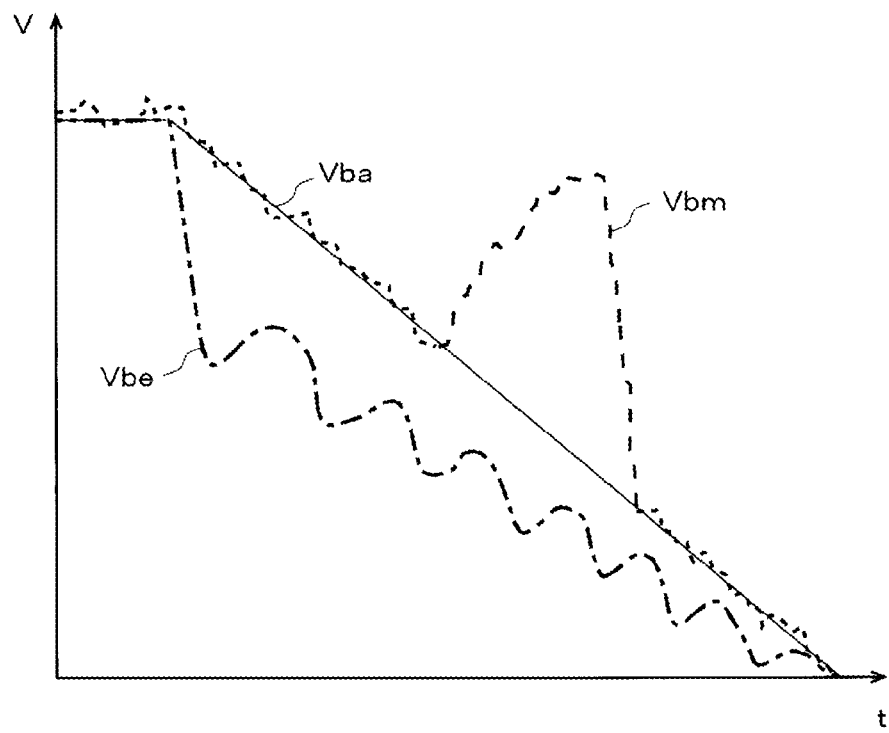
FIG. 6 is a chart of the behavior of the brake system according to the first embodiment of the invention in the control flow depicted in FIG. 3.
Figure 7:
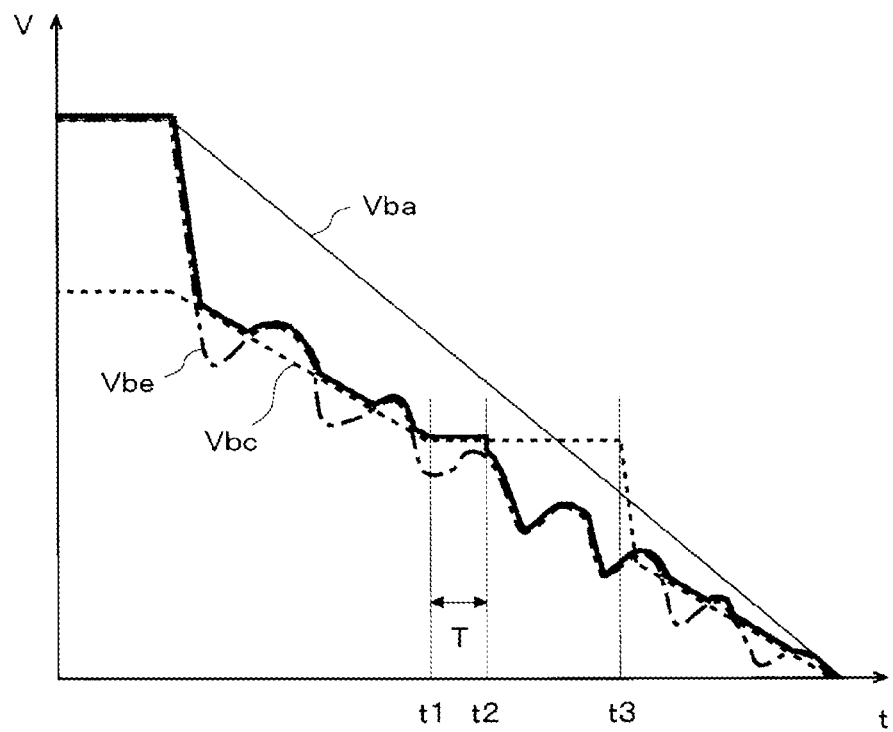
FIG. 7 is a chart of the behavior of the brake system according to the first embodiment of the invention in the control flow depicted in FIG. 3.

FIG. 4 to FIG. 7 are charts of behavior of the brake system according to the first embodiment of the invention in the control flow depicted in FIG. 3. FIG. 4 and FIG. 5 depict a case where the increasing tendency flag F is never set in step S108 when the control flow depicted in FIG. 3 is repeated during the deceleration of the motorcycle 100. Meanwhile, FIG. 6 and FIG. 7 depict a case where the increasing tendency flag F is set in step S108 when the control flow depicted in FIG. 3 is repeated during the deceleration of the motorcycle 100.

As depicted in FIG. 4 and FIG. 5, when the motorcycle 100 starts decelerating and an actual vehicle body speed Vba of the motorcycle 100 is reduced, the estimated vehicle body speed Vbe is reduced while being repeatedly increased and reduced in a region on a lower side of the actual vehicle body speed Vba. In addition, the actually-measured vehicle body speed Vbm is reduced by following the actual vehicle body speed Vba while having a significant error in comparison with the estimated vehicle body speed Vbe. Furthermore, the corrected vehicle body speed Vbc is successively reduced in the region on the lower side of the actual vehicle body speed Vba. Note that the reduction coefficient ($0<\alpha<1$) is a value with which the corrected vehicle body speed Vbc never falls below the estimated vehicle body speed Vbe. As indicated by a solid bold line in FIG. 5, due to the control of the braking force of the brake system 1, the estimated vehicle body speed Vbe is adopted in a period in which the estimated vehicle body speed Vbe is in the state of being higher than the corrected vehicle body speed Vbc, and the corrected vehicle body speed Vbc is adopted in a period in which the estimated vehicle body speed Vbe is in the state of being lower than the corrected vehicle body speed Vbc.

As depicted in FIG. 6, there is a case where the actually-measured vehicle body speed Vbm is located far above the actual vehicle body speed Vba when the motorcycle 100 starts decelerating and the actual vehicle body speed Vba of the motorcycle 100 is reduced. As depicted in FIG. 7, at the time, a period in which the corrected vehicle body speed Vbc has a constant value, that is, a period from time t1 to time t3 becomes equal to or longer than the reference time T. Note that the reference time T is such a time that the corrected vehicle body speed Vbc does not exceed the actual vehicle body speed Vba. As indicated by a solid bold line in FIG. 7, the estimated vehicle body speed Vbe is adopted in a period from time t2, at which the reference time T elapses from the time t1, to a time point at which the estimated vehicle body speed Vbe is brought into the state of being equal to or higher than the corrected vehicle body speed Vbc.

<Effects of Brake System>

A description will be made on effects of the brake system according to the first embodiment.

In the brake system 1, the controller 22 includes: the estimated vehicle body speed obtainment section 41 that obtains the estimated vehicle body speed Vbe of the motorcycle 100 estimated on the basis of the speed information Ivw of the wheel 101; the corrected vehicle body speed obtainment section 43 that obtains the corrected vehicle body speed Vbc obtained by correcting the actually-measured vehicle body speed Vbm of the motorcycle 100 to the low-speed side; and the braking force control execution section 44 that causes the brake system 1 to generate the braking force corresponding to the estimated vehicle body speed Vbe in the state where the estimated vehicle body speed Vbe is higher than the corrected vehicle body speed Vbc, and causes the brake system 1 to generate the braking force corresponding to the corrected vehicle body speed Vbc in the state where the estimated vehicle body speed Vbe is lower than the corrected vehicle body speed Vbc during the deceleration of the motorcycle 100. Accordingly, in the state where the estimated vehicle body speed Vbe significantly differs from the actual vehicle body speed Vba of the motorcycle 100, the braking force is controlled in accordance with the corrected vehicle body speed Vbc whose difference from the actual vehicle body speed Vba of the motorcycle 100 is smaller than that of the estimated vehicle body speed Vbe. In this way, the braking force generated by the brake system 1 is optimized.

The corrected vehicle body speed Vbc is preferably corrected to the low-speed side by multiplying the actually-measured vehicle body speed Vbm, which is obtained at each of the time points, by the reduction coefficient $\alpha$ ($0<\alpha<1$). In addition, the corrected vehicle body speed Vbc is preferably corrected to the low-speed side by replacing the actually-measured vehicle body speed Vbm, which is obtained at each of the time points, with the lowest actually-measured vehicle body speed Vbm obtained in the period from the initiation of the deceleration of the motorcycle 100 to the current time point. Thus, it is possible to reliably suppress occurrence of such a case that the braking force is controlled in accordance with the higher corrected vehicle body speed Vbc than the actual vehicle body speed Vba and the braking force becomes insufficient.

The braking force control execution section 44 preferably causes the brake system 1 to generate the braking force that corresponds to the estimated vehicle body speed Vbe in the states where the actually-measured vehicle body speed Vbm has the increasing tendency and the estimated vehicle body speed Vbe is lower than the corrected vehicle body speed Vbc during the deceleration of the motorcycle 100. Thus, even when reliability of the actually-measured vehicle body speed Vbm is low, it is possible to suppress occurrence of such a case that the braking force is controlled in accordance with the higher corrected vehicle body speed Vbc than the actual vehicle body speed Vba and the braking force becomes insufficient. Therefore, certainty of optimizing the braking force generated by the brake system 1 is improved.

In particular, the braking force control execution section 44 determines that the actually-measured vehicle body speed Vbm has been shifted to the state with the increasing tendency in the case where the actually-measured vehicle body speed Vbm, which is obtained at each of the time points, continues to be in the state of not becoming the lowest actually-measured vehicle body speed Vbm obtained in the period from the initiation of the deceleration of the motorcycle 100 to the current time point for the reference time T or longer. In addition, the braking force control execution section 44 causes the brake system 1 to generate the braking force that corresponds to the estimated vehicle body speed Vbe in the period from the time point at which the actually-measured vehicle body speed Vbm is shifted to be in the state with the increasing tendency to the time point at which the estimated vehicle body speed Vbe is shifted to the state of being equal to or higher than the corrected vehicle body speed Vbc. Thus, unnecessary adoption of the low estimated vehicle body speed Vbe is suppressed. Therefore, the certainty of optimizing the braking force generated by the brake system 1 is further improved.

The actually-measured vehicle body speed Vbm is preferably obtained on the basis of the speed information Ivs of the portion other than the wheel (that is, the wheel 101 and the wheel other than the wheel 101) of the motorcycle 100. Thus, it is possible to reduce necessity of adding a speed sensor to the brake system 1 for a purpose of optimizing the braking force generated by the brake system 1. Therefore, cost performance and the like of the brake system 1 are improved.

Anti-lock brake control is preferably executed when the motorcycle 100 is decelerated. The difference of the estimated vehicle body speed Vbe from the actual vehicle body speed Vba of the motorcycle 100 is changed in accordance with a change in slip occurred to the wheel 101. However, in the anti-lock brake control, an influence of such a difference is further significant. That is, the above-described control of the braking force is particularly useful when the anti-lock brake control is executed.

Modified Example

The actually-measured vehicle body speed Vbm may be obtained on the basis of the detection result of the auxiliary speed sensor 32 that detects the speed information Ivs of the wheel other than the wheel 101 of the motorcycle 100. The auxiliary speed sensor 32 may detect a rotational frequency of the wheel other than the wheel 101 or may detect another physical quantity that can be converted to the rotational frequency of the wheel other than the wheel 101. For example, the actually-measured vehicle body speed obtainment section 42 may convert the rotational frequency of the wheel other than the wheel 101, which is detected by the auxiliary speed sensor 32, to a peripheral speed Vws and obtain the peripheral speed Vws as the actually-measured vehicle body speed Vbm, or may obtain a value that is obtained by performing a specified calculation on the peripheral speed Vws as the actually-measured vehicle body speed Vbm. In other words, the actually-measured vehicle body speed Vbm may be obtained by using any of the various known methods.

In the cases where the actually-measured vehicle body speed Vbm is obtained on the basis of the speed information Ivs of the wheel other than the wheel 101 of the motorcycle 100 and, for example, the auxiliary speed sensor 32 is already provided to monitor the slip rates of both of the wheel 101 and the wheel other than the wheel 101, or the like, it is possible to reduce the necessity of adding the speed sensor to the brake system 1 for the purpose of optimizing the braking force generated by the brake system 1. Therefore, the cost performance and the like of the brake system 1 are improved.

REFERENCE SIGNS LIST

1: Brake system
11: Master cylinder
12: Wheel cylinder
13: Primary channel
14: Secondary channel
15: Inlet valve
16: Outlet valve
17: Accumulator
18: Pump
20: Hydraulic pressure control unit
21: Base body
22: Controller
31: Wheel speed sensor
32: Auxiliary speed sensor
41: Estimated vehicle body speed obtainment section
42: Actually-measured vehicle body speed obtainment section
43: Corrected vehicle body speed obtainment section
44: Braking force control execution section
100: Motorcycle
101: Wheel
T: Reference time
Vba: Actual vehicle body speed
Vbe: Estimated vehicle body speed
Vbm: Actually-measured vehicle body speed
Vbc: Corrected vehicle body speed

The invention claimed is:
1. An electronic controller for a braking force generated by a brake system of a motorcycle, the electronic controller comprising:
an estimated vehicle body speed obtainment section that obtains an estimated vehicle body speed of the motorcycle estimated on the basis of speed information of a wheel;
a braking force control execution section that causes the brake system to generate the braking force corresponding to the estimated vehicle body speed obtained by the estimated vehicle body speed obtainment section; and
a corrected vehicle body speed obtainment section that obtains a corrected vehicle body speed obtained by correcting an actually-measured vehicle body speed of the motorcycle to a low-speed side, wherein during deceleration of the motorcycle, the braking force control execution section causes the brake system to generate the braking force that corresponds to the estimated vehicle body speed in a state where the estimated vehicle body speed is higher than the corrected vehicle body speed, and causes the brake system to generate the braking force that corresponds to the corrected vehicle body speed in a state where the estimated vehicle body speed is lower than the corrected vehicle body speed.

2. The electronic controller according to claim 1, wherein the corrected vehicle body speed is corrected to the low-speed side by multiplying the actually-measured vehicle body speed, which is obtained at each time point, by a reduction coefficient.

3. The electronic controller according to claim 2, wherein the corrected vehicle body speed is corrected to the low-speed side by replacing the actually-measured vehicle body speed, which is obtained at each of the time points, with the lowest actually-measured vehicle body speed obtained in a period from initiation of the deceleration of the motorcycle to said time point.

4. The electronic controller according to claim 2, wherein the braking force control execution section causes the brake system to generate the braking force that corresponds to the estimated vehicle body speed in states where the actually-measured vehicle body speed has an increasing tendency and the estimated vehicle body speed is lower than the corrected vehicle body speed during the deceleration of the motorcycle.

5. The electronic controller according to claim 4, wherein the braking force control execution section determines that the actually-measured vehicle body speed has been shifted to the state with the increasing tendency in the case where the actually-measured vehicle body speed, which is obtained at each of the time points, continues to be in a state of not becoming the lowest actually-measured vehicle body speed obtained in the period from the initiation of the deceleration of the motorcycle to said current time point for a reference time or longer.

6. The electronic controller according to claim 4, wherein the braking force control execution section causes the brake system to generate the braking force that corresponds to the estimated vehicle body speed in a period from a time point at which the actually-measured vehicle body speed is shifted to be in the state with the increasing tendency to a time point at which the estimated vehicle body speed is shifted to a state of being equal to or higher than the corrected vehicle body speed.

7. The electronic controller according to claim 1, wherein the actually-measured vehicle body speed is obtained on the basis of speed information of a portion other than the wheel of the motorcycle.

8. The electronic controller according to claim 1, wherein the actually-measured vehicle body speed is obtained on the basis of speed information of a wheel other than the wheel of the motorcycle.

9. The electronic controller according to claim 1, wherein anti-lock brake control is executed during the deceleration of the motorcycle.

10. A control method of a braking force generated by a brake system of a motorcycle, the control method comprising:

determining, via an electronic controller, an estimated vehicle body speed of the motorcycle that is estimated on the basis of speed information of a wheel;

causing, via the electronic controller, the brake system to generate the braking force that corresponds to the estimated vehicle body speed obtained in the estimated vehicle body speed obtainment step; and determining, via the electronic controller, a corrected vehicle body speed obtained by correcting an actually-measured vehicle body speed of the motorcycle to a low-speed side, wherein during deceleration of the motorcycle, the brake system generates the braking force that corresponds to the estimated vehicle body speed in a state where the estimated vehicle body speed is higher than the corrected vehicle body speed, and the brake system generates the braking force that corresponds to the corrected vehicle body speed in a state where the estimated vehicle body speed is lower than the corrected vehicle body speed.

* * * * *